United States Patent [19]

Millar et al.

[11] Patent Number: 6,017,508
[45] Date of Patent: Jan. 25, 2000

[54] PROCESS OF MODIFYING THE POROSITY OF ALUMINOSILICATES AND SILICAS, AND MESOPOROUS COMPOSITIONS DERIVED THEREFROM

[75] Inventors: Dean M. Millar; Juan M. Garces, both of Midland, Mich.

[73] Assignee: The Dow Chemical Company, Midland, Mich.

[21] Appl. No.: 09/065,024

[22] PCT Filed: Oct. 8, 1996

[86] PCT No.: PCT/US96/16104

§ 371 Date: Apr. 20, 1998

§ 102(e) Date: Apr. 20, 1998

[87] PCT Pub. No.: WO97/15528

PCT Pub. Date: May 1, 1997

Related U.S. Application Data

[60] Provisional application No. 60/006,059, Oct. 24, 1995.

[51] Int. Cl.[7] .............................. C01B 39/02; C01B 39/44
[52] U.S. Cl. .......................... 423/700; 423/713; 423/714; 423/715; 423/716; 423/718; 423/328.1; 423/328.2; 423/DIG. 23; 502/85; 502/86; 502/232; 502/407; 502/408; 95/90; 95/143; 95/147; 95/902
[58] Field of Search ................ 423/328.1, 328.2, 423/335, 700, 713, 714, 715, 716, 718, DIG. 23; 502/85, 232, 407, 408, 86; 95/90, 143, 147, 902

[56] References Cited

U.S. PATENT DOCUMENTS

| | | | |
|---|---|---|---|
| 3,669,624 | 6/1972 | Warthen et al. . | |
| 4,397,825 | 8/1983 | Whittam | 423/718 |
| 4,401,633 | 8/1983 | Sun | 423/118 |
| 4,405,484 | 9/1983 | Miyazaki et al. | 252/174.25 |
| 4,435,516 | 3/1984 | Chang et al. | 502/71 |
| 4,550,092 | 10/1985 | Chang et al. | 502/71 |
| 4,559,315 | 12/1985 | Chang et al. | 502/71 |
| 4,579,831 | 4/1986 | Field | 502/66 |
| 4,581,212 | 4/1986 | Araya et al. . | |
| 4,605,803 | 8/1986 | Chang et al. | 585/408 |
| 4,620,054 | 10/1986 | Chang et al. | 585/481 |
| 4,665,248 | 5/1987 | Chang et al. | 585/408 |
| 4,683,334 | 7/1987 | Bergna et al. | 564/474 |
| 4,752,596 | 6/1988 | Bergna et al. | 502/64 |
| 4,784,980 | 11/1988 | Bertolacini et al. | 502/25 |
| 4,820,502 | 4/1989 | Rubin | 423/328 |
| 4,837,195 | 6/1989 | Cox et al. | 502/408 |
| 4,857,288 | 8/1989 | Marcus et al. | 423/718 |
| 5,238,676 | 8/1993 | Roth et al. | 423/713 |
| 5,366,720 | 11/1994 | Caglione et al. | 423/713 |
| 5,397,560 | 3/1995 | Millar et al. | 423/700 |
| 5,849,258 | 12/1998 | Lujano et al. | 423/713 |

FOREIGN PATENT DOCUMENTS

| | | |
|---|---|---|
| 0095846-A3 | 12/1983 | European Pat. Off. . |
| 0327735-A1 | 8/1989 | European Pat. Off. . |
| 0395373-A2 | 10/1990 | European Pat. Off. . |
| 0452084-A2 | 10/1991 | European Pat. Off. . |
| 296899-A5 | 12/1991 | Germany . |
| 4207815-A1 | 9/1993 | Germany . |

OTHER PUBLICATIONS

Derwent 83–15006 K/07 (DE 3128–757) Feb. 1983.
D. J. Drysdale, *The American Minerologist,* 56, 1971, 1718–1723. (No month).
W. M. Meier and D. H. Olson, *Atlas of Zeolite Structure Types,* 3rd edition, Butterworth–Heinemann, 1992, 60–61 and 98–99. (No month).

*Primary Examiner*—Mark L. Bell
*Assistant Examiner*—David Sample
*Attorney, Agent, or Firm*—Mariz F. Zuckerman

[57] ABSTRACT

A process of modifying the porosity of an aluminosilicate or silica whose porosity is not amenable to modification by acid extraction. The process involves contacting said aluminosilicate or silica with an alkali aluminate, and then extracting the aluminate-treated material with an extraction agent so as to form the porosity-modified aluminosilicate or silica. The process is applicable to zeolites which are unreactive under acid extraction conditions, e.g. ferrierite, and applicable to zeolites which are structurally unstable under acid extraction conditions, such as the mineral bikitaite. Mesoporous compositions are disclosed, including a mesoporous ferrierite and a mesoporous zeolite DCM-3.

23 Claims, No Drawings

PROCESS OF MODIFYING THE POROSITY OF ALUMINOSILICATES AND SILICAS, AND MESOPOROUS COMPOSITIONS DERIVED THEREFROM

This application claims the benefit of U.S. Provisional Patent Application No. 60/006,059, filed on Oct. 24, 1995, and International Patent Application No. PCT/US96/16104, filed on Oct. 8, 1996, and published as WO 97/15528 on May 1, 1997.

In one aspect, this invention pertains to a process of modifying the porosity of aluminosilicates and silicas. In another aspect, this invention pertains to crystalline mesoporous aluminosilicate compositions.

It is known that porous aluminosilicates and silicas contain an array of pores or channels, and optionally, cages. The term "porosity" will henceforth refer to this collected array of pores, channels and cages. These solids may be amorphous or may have a periodic crystalline structure. The array of pores and channels and cages may be irregular, that is non-periodic, or alternatively, they may be regular or periodic. The pores or channels may be isolated or interconnected, and may be one, two or three dimensional. For the purposes of this invention a "micropore" is defined as a pore having a radius ranging from 2 Angstroms (Å) to less than 10 Å, while a "mesopore" is defined as a pore having a radius ranging from 10 Å up to 100 Å. Pores having a radius larger than 100 Å are typically classified as "macropores."

Microporous aluminosilicates and silicas are useful as catalyst supports and as selective adsorbents for purifying gases and for separating mixtures of chemicals and isomers. In addition, microporous aluminosilicates, for example zeolites, are well known as shape selective catalysts for a wide variety of industrial organic processes. Illustrative of such processes are the isomerization and cracking of aliphatic hydrocarbons and the alkylation and transalkylation of aromatic hydrocarbons. The utility of these microporous solids depends in part on the accessibility of organic reagents and catalytic metals to the micropores or cages. If access is limited or blocked, the utility of the aluminosilicate or silica may be hampered.

Increased accessibility to the micropores of an aluminosilicate zeolite is commonly effected by extracting the zeolite with a strong acid solution. The acid removes debris in the channels, such as extra-framework alumina, and may create mesoporosity by extracting some of the framework aluminum. This process is commonly referred to as "dealumination." An increase in the mesoporosity of a microporous aluminosilicate may correlate with its increased activity as a catalyst or adsorbent.

Disadvantageously, in small ring aluminosilicates and silicas, namely those composed of 8-rings or less, the interior of the micropores may be inaccessible to acids. Other aluminosilicates, such as those having a silica/alumina molar ratio of 2 or less may be unstable under acid extraction conditions. Other silicas and aluminosilicates, irrespective of pore size, may not respond to acid treatment. Ferrierite is an example of a 10-ring zeolite which does not readily dealuminate upon treatment with acid. Accordingly, in all of these systems it can be difficult to modify their porosity solely by acid extraction.

By way of example, the mineral bikitaite is a lithium aluminosilicate represented by the oxide formula $Li_2O \cdot Al_2O_3 \cdot 4SiO_2 \cdot 2H_2O$. The X-ray diffraction pattern of bikitaite, described by W. M. Meier and D. H. Olson in the Atlas of Zeolite Structure Types, 3rd edition, Butterworth-Heinemann, 1992, p. 60–61, reveals a monoclinic framework structure containing one-dimensional 8-ring channels having the dimensions 2.8 Angstroms (Å) by 3.7 Å. Disadvantageously, the lithium ions cannot be fully exchanged with hydrogen ions without destroying the bikitaite structure. The microporous channels in bikitaite are not accessible to small molecules, and bikitaite is not known to be an efficient adsorbent or catalyst.

A cesium aluminosilicate is known which is structurally related to, but not identical to bikitaite. The composition on an anyhydrous basis is represented by the following formula, as noted in U.S. Pat. No. 4,820,502:

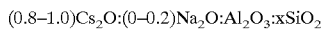

$$(0.8-1.0)Cs_2O:(0-0.2)Na_2O:Al_2O_3:xSiO_2$$

wherein x is at least 17. The original sodium cations can be replaced at least in part by other cations, including hydrogen ions, ammonium ions and certain metal ions. Disadvantageously, the cesium ions, which are more plentiful than sodium ions, are not exchangeable. Consequently, the micropores of this zeolite are inaccessible, and the zeolite is not an efficient adsorbent or catalyst.

The crystalline structure of ferrierite, also described by W. M. Meier and D. H. Olson in the Atlas of Zeolite Structure Types, op. cit., p. 98, comprises an orthorhombic framework containing two interconnected channel systems. One channel is a 10-ring structure with the dimensions 4.2 Å by 5.4 Å. The second channel is an 8-ring structure with the dimensions 3.5 Å by 4.8 Å. As noted hereinabove, the porosity of ferrierite cannot be readily modified by acid extraction.

It would be desirable to discover a process for modifying the porosity of an aluminosilicate or silica whose porosity is not amenable to modification by acid extraction. Such a process could be used to gain entry to the inaccessible micropores of small-ring systems, like bikitaite. The process might also be used to modify the porosity of an aluminosilicate or silica which is unstable in the presence of acid or which is unreactive towards acid. Increasing the mesoporosity of these aluminosilicates and silicas could dramatically improve their catalytic and adsorbent properties.

In one aspect, the invention disclosed herein is a process of modifying the porosity of an aluminosilicate or silica whose porosity is not amenable to modification by acid extraction. A simple test for selecting aluminosilicates and silicas whose porosity is not amenable to modification by acid extraction is described in detail hereinafter. The process of this invention comprises first contacting the selected aluminosilicate or silica with alkali aluminate under process conditions sufficient to prepare a porosity-modified aluminosilicate or silica precursor composition. Thereafter, the porosity-modified aluminosilicate or silica precursor composition is contacted with an extraction agent under extraction conditions sufficient to prepare the porosity-modified aluminosilicate or silica.

The process of this invention provides a means of modifying the porosity of an aluminosilicate or silica. Advantageously, the process of this invention is useful where acid extraction alone fails, particularly in small-ring structures or with structures unreactive in acid or structurally unstable in acid. By modifying the porosity of these silicas or aluminosilicates they may become more useful as catalysts and adsorbents.

In a second aspect, this invention is a composition comprising a crystalline mesoporous aluminosilicate characterized by the X-ray diffraction pattern substantially shown in Table 1 and having a mesopore volume greater than 0.060 cc/g as measured by nitrogen absorption techniques. The composition of this invention, hereinafter designated mesoporous DCM-3 or "Me-DCM-3," is useful as an adsorbent and as a catalyst.

In a third aspect, this invention is a composition comprising a crystalline aluminosilicate, in the lithium or acid form, characterized by the X-ray diffraction pattern substantially shown in Table 1 and having a mesopore volume no greater than 0.040 cc/g. This composition, hereinafter designated DCM-3, is useful as a precursor for the preparation of Me-DCM-3.

In a fourth aspect, this invention is a composition comprising an aluminosilicate having a crystalline structure, as determined by X-ray diffraction, which is isostructural with ferrierite. In addition, the composition has a ratio of mesopore volume to combined micropore and mesopore volumes, as measured by nitrogen absorption, in the range from 0.25 to less than 1.00. Ferrierite having the claimed mesoporosity is useful as an adsorbent and as a catalyst.

The process of this invention provides a general method of modifying the porosity, preferably modifying the mesoporosity, of aluminosilicates and silicas whose porosity is not amenable to modification by acid extraction. A means of determining which aluminosilicates and silicas cannot be modified by acid extraction is given by the following test. One gram of sample to be tested is slurried at ambient temperature and pressure in aqueous hydrochloric acid having a concentration ranging from 1 M to 6 M for a time ranging from 15 minutes to 30 minutes. From 5 ml to 10 ml acid solution are used per gram sample. The slurry is then filtered, and the collected solid is washed with water and dried in air at a temperature ranging from 80° C. to 120° C.

The results of the above-described test are analyzed as follows. If 50 percent or more of the sample structurally decomposes under the test conditions, as evidenced by visual inspection or preferably by X-ray diffraction analysis, the sample is not amenable to modification by acid extraction. Alteratively, if the sample retains substantially all of its crystallinity and original porosity, preferably more than 90 percent, the sample is not amenable to modification by acid extraction. In both instances, the samples are suitable for the process of this invention. With aluminosilicates the silicon to aluminum atomic ratio (Si/Al), as measured by X-ray fluoresence, is a further indicator of sample suitability. If the Si/Al ratio is essentially unchanged after the test, then the sample is unresponsive to the acid treatment and not amenable to modification by acid extraction. Such samples are also suitable for use in the process of this invention. In contrast, if the Si/Al ratio increases by a factor of two or more without significant loss in the sample's structural integrity, then acid extraction is effective and the sample should not be selected for the process of this invention.

In one preferred embodiment, the process of this invention provides a method of creating mesoporosity in a crystalline 8-ring aluminosilicate whose porosity is not amenable to modification by acid extraction. An 8-ring aluminosilicate is one whose framework structure contains pores formed from eight tetrahedral $(SiO_4)^{4-}$ and $(AlO_4)^{5-}$ units. (Likewise, 6-ring, 10-ring and 12-ring compounds contain pores formed from six, ten and twelve tetrahedral units, respectively.) In a more preferred embodiment, the 8-ring aluminosilicate exhibits an X-ray diffraction pattern substantially as shown in Table 1 or 2. After treatment by the process of this invention, the more preferred 8-ring aluminosilicate exhibits the X-ray diffraction pattern substantially shown in Table 1 and possesses a mesoporosity greater than 0.060 cc/g.

In another preferred embodiment, the process of this invention provides a method of increasing the mesoporosity of ferrierite. Ferrierite treated by the process herein exhibits a modified porosity such that the ratio of mesopore volume to combined mesopore and micropore volumes, as measured by nitrogen absorption, ranges from 0.25 to less than 1.00.

Any aluminosilicate or silica whose porosity cannot be modified by acid extraction as specified hereinabove is suitable for use in the process of this invention. Suitable materials include aluminosilicates and silicas having 6-ring or 8-ring channels whose inner volume is inaccessible to acids; as well as 10-ring and 12-ring aluminosilicates and silicas which are impervious to acid extraction. Any small or large pore materials which decompose in acid are also suitable. The aluminosilicate or silica may be amorphous or crystalline and may be a dense phase or a porous, e.g., microporous, material. Non-limiting examples of aluminosilicates which are suitable for the process of this invention include the mineral bikitaite, the lithium aluminosilicate (DCM-3) having the diffraction pattern substantially shown herein in Table 1, the cesium aluminosilicate having the diffraction pattern substantially shown herein in Table 2, and additionally, as-synthesized and dealuminated ferrierites, and zeolites isotypic with ferrierite, such as NU-23 and ZSM-35. In contrast, faujasites and zeolites beta and ZSM-5 are readily dealuminated by acid extraction and typically are not suitable for the process of this invention. Preferred materials for treatment in the process of this invention are selected from the group consisting of bikitaite, DCM-3, ferrierite, and the cesium aluminosilicate having the X-ray diffraction pattern substantially shown in Table 2.

When the starting material is a zeolite, its silica/alumina molar ratio may range broadly, from as low as 2 to as high as 1000. Preferably, the silica/alumina molar ratio ranges from 2 to less than 500, and most preferably, from 2 to less than 150.

If the aluminosilicate or silica is to be used as a catalyst or an adsorbent, it might be desirable to form a composite in which the aluminosilicate or silica is bound or extruded with an inert binder or support. Such binders include, for example, alumina, silica, silica-alumina, titania, zirconia, and clays. If a binder or support is used, then it is preferable for the treatment of this invention to be conducted prior to compositing the aluminosilicate or silica with the binder or support. It may not be beneficial for the binder or support to be exposed to alkali aluminate, as such a treatment may affect the binder structure or properties.

An alkali aluminate is required for the process of this invention. Preferably, an aqueous solution of alkali aluminate is employed. Suitable alkali aluminates include lithium aluminate, sodium aluminate, potassium aluminate, rubidium aluminate and cesium aluminate. Preferably, the alkali aluminate is sodium or potassium aluminate. Any concentration of alkali aluminate solution may be used provided that the porosity of the reagent aluminosilicate or silica is modified. Preferably, the concentration of alkali aluminate ranges from 0.01N to 2.5N. More preferably, the concentration ranges from 0.5N to 2.5N, most preferably, from 1.0N to 2.5N. Below the lower preferred concentration of 0.01N, the solution may be too weak to effect modification of the porosity. Above the upper preferred concentration of 2.5N, the solution may damage the crystallinity of the aluminosilicate or silica, as evidenced by an increasingly amorphous X-ray diffraction pattern.

The aluminosilicate or silica and the alkali aluminate can be contacted in any manner known to those skilled in the art. Any reactor is suitable that is not damaged by the alkali aluminate. Suitable reactors include teflon-lined batch reactors, polypropylene bottles, and stainless steel reactors.

The alkali aluminate can be added to the aluminosilicate or silica; or conversely, the aluminosilicate or silica can be added to the alkali aluminate. If the alkali aluminate is in solution, then typically from 5 ml to 10 ml of alkali aluminate solution are used per gram of solid. Preferably, the solid is submerged in excess solution to form a slurry. The slurry is usually agitated or stirred, although this is not required. The technique described herein is not to be equated with an impregnation technique wherein only sufficient solution is employed to fill the accessible pores of the zeolite.

The contacting of the alkali aluminate with the aluminosilicate or silica is carried out under any operable process conditions sufficient to produce a porosity-modified aluminosilicate or silica precursor composition. Preferably, the process conditions are sufficient to retain more than 50 percent of the crystallinity of the starting material, more preferably, 70 percent of the crystallinity of the starting material. Typically, the temperature ranges from ambient, taken as 22° C., to 110° C., preferably, from 65° C. to 95° C., and more preferably, from 75° C. to 85° C. The reaction time can vary depending upon the temperature of the process, the concentration of the alkali aluminate solution, and the crystalline structure of the aluminosilicate or silica. Generally, the contacting time varies from 30 minutes to 2 hours, and more preferably, from 30 minutes to 1 hour. The pressure of the process is autogenous.

The contacting of the aluminosilicate or silica with the alkali aluminate should be conducted in the absence of additional alkali hydroxide, such as sodium hydroxide. By "additional alkali hydroxide" is meant alkali hydroxide which exceeds the equilibrium concentration of hydroxide present in an aqueous alkali aluminate solution. Hydroxide in excess of the equilibrium concentration may damage the crystallinity of the aluminosilicate or silica.

Just how the alkali aluminate treatment modifies porosity is the subject of some conjecture. It is believed that the alkali aluminate desilicates a portion of the aluminosilicate or silica thereby producing a modification in porosity. The resulting porosity-modified precursor composition cannot be described in precise terms. It is believed that the composition comprises a porosity-modified aluminosilicate or silica whose pores contain silicate debris and alkali ions. Such theories, however, should not be binding upon the process of this invention.

When treatment with alkali aluminate is complete, the mixture or slurry is filtered, and the treated aluminosilicate or silica is washed amply with water. Afterwards, optionally, the solid may be calcined. The optional calcination may be useful in annealing or healing the crystalline structure. Typically large-pore materials, such as ferrierite, benefit from a calcination step. Generally, the calcination comprises heating the solid in the presence of an oxygen-containing gas, such as air, at a temperature between 300° C. and 800° C., preferably, between 500° C. and 600° C.

Following the aluminate treatment and optional calcination, an extraction step is employed if the modification of porosity is to be fully exploited. Accordingly, the porosity-modified precursor composition is treated with an extraction agent under extraction conditions sufficient to prepare the desired porosity-modified aluminosilicate or silica product. Broadly, the extraction agent can include acids, ammonium salts, bases, quaternary amine salts, inorganic and organic solvents, and metal ion salts. Preferably, the salts are dissolved in solution. Preferably, the extraction is performed with a solution of an acid or an ammonium salt. The acid may be an inorganic acid, suitable examples of which include hydrochloric, sulfuric, and nitric acids; or an organic acid, suitable examples of which include formic acid, acetic acid, and propionic acid. Suitable ammonium salts include ammonium chloride, ammonium nitrate, ammonium citrate, and ammonium oxalate. For those silicas or aluminosilicates which tend to decompose in inorganic acid, an organic acid at a lower concentration or an ammonium salt should be used. Typically, the concentration of extraction agent ranges from 0.5 M to 6.0 M, and preferably, from 1.0 M to 2.0 M. The quantity of extraction solution ranges typically from 5 ml to 10 ml per gram of aluminosilicate or silica. The extraction is effected at a temperature ranging from ambient, taken as 22° C., to 200° C. for a time ranging from 15 minutes to 1 hour, and for preferred extraction solutions at a temperature from ambient to the reflux temperature of the solution. If desired, the alkali aluminate treatment, optional calcination, and extraction may be repeated several times. Also, one final optional calcination may be conducted at a temperature ranging between 300° C. and 800° C.

When the aforementioned aluminosilicates and silicas are treated by the process of this invention, the porosity of the starting solid is modified, and preferably, the mesoporosity is increased over that of the starting material. Total pore volume is typically measured on the aluminosilicate or silica in powder form using as the adsorbate nitrogen at 77K or argon at 88K and using any suitable analyzer, such as a Micromeritics ASAP 2000 instrument. Measurements of mesopore volume are derived from the adsorption volume of pores having a radius in the range from 10 Å to 100 Å.

It is noted that the mesoporosity measured in this invention is a true "intra-particle" mesoporosity which depends on the internal molecular pore structure of the solid. In contrast, some materials unlike those of this invention possess a mesoporosity which depends on the void spaces between particles. This latter type of mesoporosity is referred to as "inter-particle" mesoporosity. In determining which type of mesoporosity is being measured, attention should be paid to the following details: (1) Intra-particle mesoporosity is essentially independent of particle size. In contrast, inter-particle mesoporosity is dependent on particle size. As particle size decreases, the packing void volume and the inter-particle mesoporosity tend to increase. (2) An increase in intra-particle mesoporosity is often accompanied by an increase or decrease in microporosity depending upon the structure. In contrast, an increase in inter-particle mesoporosity is generally not accompanied by an increase or decrease in microporosity. Transmission election microscopy can be helpful in corroborating the type of mesoporosity measured.

For microporous materials, such as ferrierite, another measure of mesoporosity is given by the ratio of the volume of mesopores (Me) to the combined volumes of micropores (Mi) plus mesopores: Me/(Mi+Me). For microporous materials treated by the process of this invention, this ratio ranges from 0.25 to less than 1.00. Information regarding the distribution of micropores and mesopores can be probed by analyzing the pore size distributions obtained from argon adsorption measurements using density functional theory. For an explanation, see J. P. Olivier and W. B. Conklin, International Symposium on the Effects of Surface Heterogeneity in Adsorption and Catalysis on Solids, Kazimierz Dolny, Poland, July 1992.

In addition to the above, Brunauer-Emmett-Teller (BET) surface area measurements are good indicators of micro and meso porosities. The measurement of BET surface area is described by Charles N. Satterfield in Heterogeneous Catalysis in Practice, McGraw-Hill Book Company, 1980, p. 100–106. The BET total surface area can be calculated from the measurement of total pore volume. In small pore materials, such as DCM-3, post-treatment increases in total surface area and micropore surface area are frequently observed. With large pore materials, such as ferrierite, the changes in total surface area and micropore surface area are not as readily generalized.

As regards its structure, the modified aluminosilicate or silica typically retains greater than 50 percent, and preferably greater than 70 percent, of its original crystallinity, as measured by X-ray diffraction. The term "original crystallinity" refers to the crystallinity of the untreated material.

The process of this invention may also modify the silicon/aluminum atomic ratio, where applicable. Typically if this happens, the ratio decreases over that of the starting material. Under some circumstances it may be desirable to increase the silicon/aluminum ratio in the porosity-modified product. If so, then the modified aluminosilicate may be treated with acid to remove a portion of the aluminum, provided that the crystalline structure and/or porosity does not collapse in the presence of acid. Acid treatment methods are known to those skilled in the art. One such treatment involves suspending and stirring the material to be treated in an aqueous inorganic acid having a concentration between 1 M and 6 M at a temperature between ambient and the reflux temperature of the acid solution for a time ranging from 30 minutes to 3 hours. Note, however, that the aluminosilicates used in the process of this invention typically dealuminate only to a small extent if at all, and their porosity is not significantly affected by acid treatment.

Among the crystalline materials which can be treated by the process of this invention is an 8-ring aluminosilicate having in the lithium form the X-ray diffraction pattern substantially shown in Table 1 and having in the cesium form the X-ray diffraction pattern substantially shown in Table 2.

TABLE 1

X-ray Diffraction Spectrum of Li+ Aluminosilicate (Cu Kα)

| 2Θ | d (A) | 100xI/Imax |
|---|---|---|
| 11.2 | 7.9 | 10 |
| 13.2 | 6.7 | 18 |
| 20.9 | 4.2 | 88 |
| 22.5 | 3.9 | 8 |
| 23.9 | 3.7 | 18 |
| 26.6 | 3.4 | 100 |
| 27.3 | 3.3 | 43 |
| 28.7 | 3.1 | 13 |
| 30.7 | 2.9 | 8 |
| 32.8 | 2.8 | 7 |
| 35.6 | 2.5 | 43 |
| 37.7 | 2.4 | 8 |
| 44.9 | 2.0 | 8 |
| 46.7 | 1.94 | 10 |
| 47.7 | 1.90 | 8 |
| 49.2 | 1.85 | 10 |
| 50.0 | 1.81 | 10 |

TABLE 2

X-ray Diffraction Spectrum of Cs+ Aluminosilicate[1] (Cu Kα)

| Interplanar d Spacing (Å) | Relative Intensity I/I$_0$ |
|---|---|
| 7.42 ± 0.2 | w |
| 6.72 ± 0.2 | w |

TABLE 2-continued

X-ray Diffraction Spectrum of Cs+ Aluminosilicate[1] (Cu Kα)

| Interplanar d Spacing (Å) | Relative Intensity I/I$_0$ |
|---|---|
| 4.28 ± 0.2 | s–vs |
| 4.02 ± 0.1 | w |
| 3.68 ± 0.1 | w |
| 3.35 ± 0.05 | s–vs |
| 3.29 ± 0.05 | m–vs |
| 3.14 ± 0.05 | w–m |
| 2.946 ± 0.05 | w |
| 2.791 ± 0.02 | w |
| 2.716 ± 0.02 | w |
| 2.532 ± 0.02 | w–s |
| 2.381 ± 0.02 | w |
| 2.357 ± 0.02 | w |
| 2.182 ± 0.02 | w |
| 2.013 ± 0.02 | w |
| 1.946 ± 0.02 | w |
| 1.911 ± 0.02 | w |
| 1.843 ± 0.02 | w |
| 1.815 ± 0.02 | w |
| 1.688 ± 0.02 | w |
| 1.672 ± 0.02 | w |
| 1.640 ± 0.02 | w |
| 1.587 ± 0.02 | w |
| 1.565 ± 0.02 | w |

[1]Reproduced from U.S. Pat. No. 4,820,502.
W = weak,
m = medium,
s = strong

The X-ray diffraction data shown in Table 1 are obtained on powder samples using copper Kα radiation and a computerized Philips diffractometer. The interplanar spacings (d's) are calculated in Angstrom units (Å). The relative intensities of the lines in Table 1 are given as 100×I/Imax where Imax is the strongest line above background. U.S. Pat. No. 4,820,502 describes the collection of the data given in Table 2. It should be understood that diffraction data listed for these samples as single lines may consist of multiple overlapping lines which under certain conditions, such as differences in crystallite sizes or very high experimental resolution or crystallographic changes, may appear as resolved or partially resolved lines.

The XRD data from Tables 1 and 2 show that the structures contain non-intersecting 8-ring micropore channels similar to those found in the natural mineral bikitaite. The 8-ring free aperture is 3.24 Å×4.86 Å. In the lithium form, the material has a mesoporosity no greater than 0.040 cc/g, preferably no greater than 0.030 cc/g.

The molar composition on an anhydrous basis of the cesium aluminosilicate characterized by the X-ray pattern of Table 2 is given as:

$$(0.8-1.0)Cs_2O:(0-0.2)Na_2O:Al_2O_3:xSiO_2$$

wherein x is at least 17, usually from 17 to 100, more usually from 17 to 60. The preparation and properties of this cesium aluminosilicate are described in U.S. Pat. No. 4,820,502, relevant sections of which are incorporated herein by reference.

The molar composition on an anhydrous basis of the lithium aluminosilicate DCM-3 characterized by the X-ray diffraction pattern of Table 1 is given as:

$$Li_2O:ySiO_2:Al_2O_3$$

wherein y ranges from 8 to 12. DCM-3 can be prepared by hydrothermal crystallization from a reactive gel comprising water, a source of silica, a source of alumina, and lithium carbonate.

Generally, the crystalline structure characteristic of DCM-3 is not achieved if Group IA cations other than lithium ions or Group IIA cations are present in significant quantity in the reaction gel. Examples of these impurity ions include sodium, potassium, cesium and magnesium ions. Thus, any source of silica is acceptable for the preparation of DCM-3 provided that the source is reactive and is essentially free of the aforementioned Group IA and IIA impurity ions. For the purposes of this invention, the term "essentially free" is defined as a concentration of less than 0.1 weight percent. Non-limiting examples of suitable sources of reactive silica include amorphous silicas, such as amorphous fumed silica, as well as, lithium silicate and silica gel. In addition, Ludox AS-40® brand colloidal silica, which is stabilized with ammonium ions, is a suitable source of silica. Water glass and silicic acid, both of which normally contain sodium ions, and brands of colloidal silica containing sodium ions are not suitable sources of silica for this preparation. Preferably, the source of silica is amorphous fumed silica.

Any source of alumina is suitable for the preparation of DCM-3 provided that the alumina is also essentially free of the impurity ions noted hereinbefore. For example, anhydrous and hydrated forms of alumina are acceptable, but sodium aluminate is not. Preferably, the source of alumina is pseudo-boehmite alumina. The molar ratio of silica to alumina in the preparative reaction mixture can be any effective ratio which produces the composition of this invention. Typically, the $SiO_2/Al_2O_3$ molar ratio in the preparative reaction mixture ranges from 5 to 30, preferably, from 10 to 20.

The preparation of DCM-3 also requires a source of lithium ions. Lithium carbonate is particularly beneficial and is the preferred source of lithium ions.

The atomic ratio of lithium ions to silicon atoms in the preparative reaction mixture may be any which provides the lithium aluminosilicate DCM-3. Typically, the Li+/Si ratio ranges from 0.40 to 1.25. Preferably, the ratio ranges from 0.40 to 0.80, and more preferably, from 0.70 to 0.80.

In a general procedure for preparing DCM-3, the reactive sources of alumina and lithium ions are mixed with water to form an aqueous suspension. The amount of water employed in the process is any amount which provides the composition DCM-3. Usually, the amount of water is sufficient to provide a $H_2O/SiO_2$ molar ratio in the range from 9 to 50, preferably, from 18 to 36. The aqueous suspension of reactive alumina and lithium sources is thereafter thoroughly mixed with the reactive source of silica to form a reactive gel. An initial pH between 10.0 and 11.0 is preferred.

The reaction gel is placed in a suitable pressure vessel, such as a teflon-lined or stainless steel autoclave, and the vessel is heated without agitation until crystallization is complete. Typically, the temperature of heating varies from 200° C. to 350° C., preferably, from 250° C. to 350° C., and more preferably, from 275° C. to 325° C. The crystallization time will vary with the nature of the reaction mixture employed and the crystallization temperature. Typically, the heating time ranges from 4 to 10 days, but preferably from 5 to 7 days. The reactor pressure is autogenous. The synthesis may be facilitated by the addition of seed crystals to the crystallization mixture. DCM-3 is recovered from the reaction gel by standard methods known to those skilled in the art, such as filtration.

The conversion of DCM-3 from the lithium form to its acid form H-DCM-3 can be effected by exchanging hydrogen ions for lithium ions under acidic conditions. Suitable acids include hydrochloric acid, sulfuric acid and nitric acid. The concentration of the acid is suitably in the range from 1 M to 6 M, preferably, from 3 M to 6 M. The amount of acid per gram zeolite varies depending upon the molarity of the acid solution, but preferably varies from 5 g to 20 g acid solution per gram zeolite. The temperature at which the acid treatment is conducted generally ranges from ambient, taken as 22° C., to 150° C., and preferably, from 100° C. to 150° C. The acid exchange treatment leaves the microporosity, mesoporosity and Si/Al atomic ratio essentially unchanged.

When the cesium aluminosilicate or DCM-3 described hereinabove is treated to the porosity-modification process of this invention, mesoporous DCM-3 is obtained, preferably in an acid or ammonium form. This mesoporous composition is characterized by the X-ray diffraction pattern substantially shown in Table 1 and by a mesopore volume typically greater than 0.060 cc/g. Preferably, the mesopore volume is greater than 0.070 cc/g, more preferably, greater than 0.080 cc/g.

Another preferred zeolite which can be treated by the process of this invention is ferrierite, preferably, having a silica/alumina molar ratio between 12 and 25. Prior to treatment ferrierite exhibits a ratio of mesopore volume to combined micropore and mesopore volumes of 0.15. Post treatment, a mesoporous ferrierite is obtained which has a ratio of mesopore volume to combined micropore and mesopore volumes of between 0.25 and less than 1.00.

The following examples are illustrative of the process of this invention and the novel compositions derived therefrom. The examples should not be construed to be limiting of this invention. Surface areas and pore volumes are measured by the BET method on a Micromeritics ASAP 2000 instrument using nitrogen at 77K and argon at 88K as adsorbents.

EXAMPLE 1

Aluminate Treatment of Natural Bikitaite

Natural bikitaite (1 g) having a Si/Al atomic ratio of 2, a surface area of 2 $m_2$/g, and a mesopore volume of 0.010 cc/g is slurried with 1 M aqueous sodium aluminate (10 ml). The slurry is transferred to a teflon-lined reactor (45 ml), and the reactor is placed into an oven and held at 110° C. for 12 hours. Thereafter, the reactor is cooled to room temperature. The solids are collected by filtration, washed with an excess of water, and extracted with 1 M hydrochloric acid (20 ml) for 15 minutes at ambient temperature. The exchanged solids are filtered, washed with water, and the extraction process is repeated twice. Then the solids are filtered, washed with water, dried at 85° C., and calcined in air at 600° C. for 4 hours. The thus-treated bikitaite exhibits a Si/Al ratio of 0.9, a surface area of 67 $m^2$/g, and an mesopore volume of 0.088 cc/g. XRD shows high structural retention. It is seen that bikitaite treated to the process of this invention exhibits an increased total surface area and mesopore volume.

EXAMPLE 2

Preparation of Zeolite DCM3

A reaction gel of the composition $4Li_2O.Al_2O_3.10SiO_2$ with a Si/$H_2O$ ratio of 36 is prepared as follows. In a plastic beaker, alumina (11.33 g, Catapal B® bohemite alumina), lithium carbonate (29.54 g), and deionized water (368.4 g) are mixed and stirred. The mixture is poured into a 2 l beaker containing silica (60.1 g; Aerosil® fumed silica). The resulting slurry is mixed until homogeneous and then transferred to a container where the mixture is rolled on a ball mill for 12 to 18 hours with alumina milling media. The resulting reaction gel (pH 10.5) is transferred to a 1 l autoclave and heated without agitation at 300° C. and autogenous pressure over a period of 5 days. At the end of the reaction period, a crystalline product is recovered by filtering the reaction gel. The product is washed with an excess of water and dried at 85° C. in air. As determined by elemental analysis, the product is a lithium aluminosilicate having the anhydrous composition:

$$Li_2O:Al_2O_3:9.4SiO_2$$

The surface area is 12.7 m$^2$/g and the mesopore volume is 0.022 cc/g. No measurable micropore volume is found.

The lithium aluminosilicate is converted into its acid form by heating at 150° C. for 48 hours in 6 M hydrochloric acid (10 ml acid solution per g solid) in a teflon-lined autoclave. The acid-exchanged solid is collected by filtration, washed with an excess of water, and dried at 85° C. in air. Analysis of the exchanged aluminosilicate by XRD gives the diffraction pattern shown in Table 1. After acid treatment the Si/Al ratio, mesoporosity and microporosity are essentially unchanged from the starting material.

EXAMPLE 3

Aluminate Treatment of Zeolite DCM-3

Zeolite DCM-3 (Li+ form), prepared in Example 2 and having a surface area of 12.7 m$^2$/g, a mesopore volume of 0.022 cc/g, and no measurable microporosity, is treated with sodium aluminate and then extracted in a manner similar to that described in Example 1. The aluminate and extraction treatments are repeated twice. The resulting DCM-3 exhibits an increased surface area of 127 m$^2$/g of which 51 m$^2$/g is micropore area. The mesopore volume is increased to 0.098 cc/g. XRD of the treated material shows high structural retention.

EXAMPLE 4

Aluminate Treatment of Zeolite DCM-3

Zeolite DCM-3 (Li+ form), prepared in Example 2 and having a Si/Al atomic ratio of 4.7, a surface area of 12.7 m$^2$/g, a mesopore volume of 0.022 cc/g, and no measurable microporosity, is treated with sodium aluminate and then acid extracted in a manner similar to that described in Example 1, with the exception that the sodium aluminate treatment is carried out for 8 hours rather than 12 hours. The once-treated zeolite exhibits a Si/Al ratio of 6.2, a surface area of 27 m$^2$/g, a mesopore volume of 0.033 cc/g, and a micropore surface area of 8 m2/g. The sodium aluminate and acid treatments are repeated once. The twice-treated zeolite exhibits a Si/Al ratio of 2.9, a surface area of 61 m$^2$/g, a mesopore volume of 0.065 cc/g, and a micropore area of 17 m$^2$/g. The sodium aluminate and acid treatments are repeated once again. The thrice-treated zeolite exhibits a Si/Al ratio of 1.7, a surface area of 83 m$^2$/g, a mesopore volume of 0.087 cc/g, and a micropore area of 8.3 m$^2$/g. It is seen that each additional aluminate treatment increases the surface area and mesopore volume. XRD of the treated materials shows high structural retention.

EXAMPLE 5

Aluminate Treatment of Cs,Na Zeolite

A cesium-sodium aluminosilicate having a silica/alumina molar ratio of 70 is prepared by the method described in U.S. Pat. No. 4,820,502. The sample is prepared with silica sol (30 percent SiO$_2$) as the source of silicon, sodium aluminate as the source of aluminum, and 50 percent aqueous cesium hydroxide solution as the source of cesium. The composition of the reaction gel, in molar ratios, is as follows:

SiO$_2$/Al$_2$O$_3$=70
OH—/SiO$_2$=0.20
H$_2$O/SiO$_2$=30.0
(Cs+)/(Cs++Na+)=0.82

The reaction mixture is held at 160° C. for 38 days. The as-synthesized product has a surface area of 21 m$^2$/g, a mesopore volume of 0.048 cc/g, and essentially no micropore volume.

The cesium-sodium zeolite is treated once with sodium aluminate and hydrochloric acid according to the procedure of Example 1. Post treatment the zeolite has a surface area of 237 m$^2$/g, a mesopore volume of 0.089 cc/g, and a micropore surface area of 173 m$^2$/g. XRD of the treated material shows high structural retention.

EXAMPLE 6

Aluminate Treatment of Cs,Na Zeolite

A cesium-sodium aluminosilicate having a Si/Al ratio of 37 is prepared from a reaction gel having the following composition:

SiO$_2$/Al$_2$O$_3$=72.7
H$_2$O/SiO$_2$=30.0
(Cs+)/(Cs++Na+)=0.82

The reaction mixture is held at 175° C. for 6 days in a stirred reactor. The zeolite exhibits a surface area of 30 m$^2$/g, a mesopore volume of 0.045 cc/g, and essentially no microporosity.

The zeolite is suspended and stirred in 2.5 M aqueous sodium aluminate for 1 hour at 80° C., then collected by filtration, washed three times with 1 M hydrochloric acid, and refluxed in 1 M hydrochloric acid for 1 hour. The zeolite is filtered, washed three times with water, and calcined at 550° C. in air for 2 hours. Post-treatment the total surface area is 294 m$^2$/g, the micropore surface area is 226 m$^2$/g, and the mesopore volume is 0.128 cc/g. XRD of the treated material shows high structural retention.

EXAMPLES 7(a–c)

Aluminate Treatment of Ferrierite

Ferrierite having the properties shown in Table 3 is treated with sodium aluminate and hydrochloric acid according to the following procedure. The sample is treated at 80° C. for 1 hour with 2.5 M aqueous sodium aluminate, then filtered, then washed three times with water. Then, the zeolite is calcined in air for 2 hours at 550° C. Afterwards, the zeolite is refluxed in 6M hydrochloric acid for 1 hour, filtered, washed three times with water, and calcined at 550° C. for 2 hours to yield Sample 7(a). The acid treatment, washing and calcination are repeated once to yield Sample 7(b). The acid treatment, washing and calcination are repeated a second time to yield Sample 7(c). The properties of the untreated and treated materials are shown in Table 3.

TABLE 3

Properties of Aluminate-Treated Ferrierite

| Ferrierite | Si/Al | Total Surface Area m²/g | Micropore Surface Area m²/g | Mesopore Volume cc/g | Me/(Me + Mi) |
|---|---|---|---|---|---|
| Untreated | 8.2 | 310 | 289 | 0.025 | 0.15 |
| 7(a) | 4.5 | 239 | 170 | 0.121 | 0.59 |
| 7(b) | 6.9 | 249 | 193 | 0.089 | 0.48 |
| 7(c) | 8.0 | 259 | 202 | 0.092 | 0.48 |

It is seen in Example 7(a) that the aluminate and first acid treatments of ferrierite increase mesopore volume. Subsequent acid treatments tend to increase surface and micropore areas while still maintaining high mesoporosity. A family of porosity-modified ferrierites can be prepared by the process. XRD of the treated materials shows high structural retention.

EXAMPLE 8

Small Molecule Adsorption by Aluminate-Treated Zeolites

Small molecule adsorption experiments with methanol, n-hexane, and benzene are performed on a McBain balance. Aluminate-treated zeolites from Examples 3, 5, and 7(a–c) are exposed to vapors of the adsorbate. Zeolites are activated at 1 50° C. for 1 hour, then cooled to ambient temperature under dynamic vacuum prior to exposure to the sorbate. For comparative purposes, the untreated zeolites from Examples 3, 5 and 7 are also tested. Sorbate test conditions and data are set forth in Table 4.

TABLE 4

Small Molecule Adsorption Data for Untreated and Treated Zeolites

| Sample | Sorbate | Comparative Experiment: Untreated sample mmol adsorbed/g | Example: Treated sample mmol adsorbed/g |
|---|---|---|---|
| 3 | Methanol[a] | 0 | 1.39 |
| 5 | " | 0 | 2.79 |
| 3 | n-Hexane[b] | 0 | 0.51 |
| 5 | " | 0 | 0.72 |
| 7a | n-Hexane[c] | 0.61 | 0.78 |
| 7b | " | 0.61 | 0.77 |
| 7c | " | 0.61 | 0.77 |
| 3 | Benzene[d] | 0 | 0.63 |
| 5 | " | 0 | 0.98 |
| 7a | Benzene[e] | 0.06 | 0.42 |
| 7b | " | 0.06 | 0.23 |
| 7c | " | 0.06 | 0.20 |

All adsorptions measured at 25° C. and at the following pressures:
[a]120 torr;
[b]145 torr;
[c]60 torr;
[d]90 torr;
[e]40 torr.

What is claimed is:

1. A process of preparing a porosity-modified aluminosilicate or silica, the process comprising contacting an aluminosilicate or silica, whose porosity is not amenable to modification by acid extraction, with alkali aluminate under reaction conditions sufficient to prepare a porosity-modified aluminosilicate or silica precursor composition; and thereafter treating the porosity-modified aluminosilicate or silica precursor composition with an extraction agent under extraction conditions sufficient to prepare the porosity-modified aluminosilicate or silica.

2. The process of claim 1 wherein the silica is selected from crystalline and amorphous silicas comprised of 10-rings or less and wherein the aluminosilicate is selected from the group consisting of ferrierite, NU-23, ZSM-35, bikitaite, the lithium aluminosilicate having the X-ray diffraction pattern substantially shown in Table 1 hereinafter:

TABLE 1

| 2Θ | d (A) | 100xI/Imax |
|---|---|---|
| 11.2 | 7.9 | 10 |
| 13.2 | 6.7 | 18 |
| 20.9 | 4.2 | 88 |
| 22.5 | 3.9 | 8 |
| 23.9 | 3.7 | 18 |
| 26.6 | 3.4 | 100 |
| 27.3 | 3.3 | 43 |
| 28.7 | 3.1 | 13 |
| 30.7 | 2.9 | 8 |
| 32.8 | 2.8 | 7 |
| 35.6 | 2.5 | 43 |
| 37.7 | 2.4 | 8 |
| 44.9 | 2.0 | 8 |
| 46.7 | 1.94 | 10 |
| 47.7 | 1.90 | 8 |
| 49.2 | 1.85 | 10 |
| 50.0 | 1.81 | 10 | and the cesium aluminosilicate having the X-ray diffraction pattern substantially shown in Table 2 hereinafter:

TABLE 2

| Interplanar d Spacing (Å) | Relative Intensity I/I₀ |
|---|---|
| 7.42 ± 0.2 | w |
| 6.72 ± 0.2 | w |
| 4.28 ± 0.2 | s–vs |
| 4.02 ± 0.1 | w |
| 3.68 ± 0.1 | w |
| 3.35 ± 0.05 | s–vs |
| 3.29 ± 0.05 | m–vs |
| 3.14 ± 0.05 | w–m |
| 2.946 ± 0.05 | w |
| 2.791 ± 0.02 | w |
| 2.716 ± 0.02 | w |
| 2.532 ± 0.02 | w–s |
| 2.381 ± 0.02 | w |
| 2.357 ± 0.02 | w |
| 2.182 ± 0.02 | w |
| 2.013 ± 0.02 | w |
| 1.946 ± 0.02 | w |
| 1.911 ± 0.02 | w |
| 1.843 ± 0.02 | w |
| 1.815 ± 0.02 | w |
| 1.688 ± 0.02 | w |
| 1.672 ± 0.02 | w |
| 1.640 ± 0.02 | w |
| 1.587 ± 0.02 | w |
| 1.565 ± 0.02 | w | w = weak;
m = medium;
s = strong.

3. The process of claim 1 wherein the aluminosilicate has a silica/alumina molar ratio ranging from 2 to less than 500.

4. The process of claim 1 wherein the alkali aluminate is sodium aluminate or potassium aluminate.

5. The process of claim 1 wherein the alkali aluminate is in an aqueous solution and has a concentration ranging from 0.01N to 2.5N.

6. The process of claim 5 wherein the contacting of the aluminosilicate or silica with the alkali aluminate is conducted for a time from 30 minutes to 2 hours using from 5 ml to 10 ml of alkali aluminate solution per gram of aluminosilicate or silica.

7. The process of claim 1 wherein the contacting of the aluminosilicate or silica with the alkali aluminate is conducted at a temperature ranging from 22° C. to 110° C.

8. The process of claim 1 wherein prior to the extraction step the porosity-modified precursor composition is calcined in the presence of an oxygen-containing gas at a temperature between 300° C. and 800° C.

9. The process of claim 1 wherein the extraction agent is an acid or an ammonium salt.

10. The process of claim 9 wherein the acid is selected from the group consisting of hydrochloric, nitric, sulfuric, formic, acetic, and propionic acids; and wherein the ammonium salt is selected from the group consisting of ammonium chloride, ammonium nitrate, ammonium citrate and ammonium oxalate.

11. The process of claim 1 wherein the extraction is conducted at a temperature ranging from 22° C. to 150° C., and wherein optionally after extraction the porosity-modified aluminosilicate or silica is calcined at a temperature between 300° C. and 800° C.

12. The process of claim 1 wherein the contacting with alkali aluminate and the extraction are repeated at least once.

13. The process of claim 1 wherein after extraction the porosity-modified aluminosilicate is treated with acid so as to increase the silicon/aluminum atomic ratio.

14. The process of claim 2 wherein the akali aluminate is an aqueous solution of alkali aluminate having a concentration in the range from 0.01N to 2.5N; wherein the aluminosilicate and the alkali aluminate are contacted at a temperature in the range from 22° C. to 110° C.; wherein the extraction agent is an acid or ammonium salt solution having a concentration between 0.5 M and 6 M; and wherein the porosity-modified precursor composition and the extraction agent are contacted at a temperature between 22° C. and the reflux temperature of the acid or ammonium salt solution.

15. A composition comprising a crystalline aluminosilicate in the lithium form having a mesopore volume no greater than 0.040 cc/g and having the X-ray diffraction pattern substantially shown in Table 1 hereinafter:

TABLE 1

| 2Θ | d (A) | 100xI/Imax |
|---|---|---|
| 11.2 | 7.9 | 10 |
| 13.2 | 6.7 | 18 |
| 20.9 | 4.2 | 88 |
| 22.5 | 3.9 | 8 |
| 23.9 | 3.7 | 18 |
| 26.6 | 3.4 | 100 |
| 27.3 | 3.3 | 43 |
| 28.7 | 3.1 | 13 |
| 30.7 | 2.9 | 8 |
| 32.8 | 2.8 | 7 |
| 35.6 | 2.5 | 43 |
| 37.7 | 2.4 | 8 |
| 44.9 | 2.0 | 8 |
| 46.7 | 1.94 | 10 |
| 47.7 | 1.90 | 8 |
| 49.2 | 1.85 | 10 |
| 50.0 | 1.81 | 10. |

16. The composition of claim 15 having in the lithium form an oxide composition on an anhydrous basis of:

$$LiO_2 : ySiO_2 : Al_2O_3$$

wherein y ranges from 8 to 12.

17. A process of preparing the composition of claim 15 comprising heating a mixture containing water, a source of silica, a source of alumina, and lithium carbonate, wherein the sources of silica and alumina are essentially free of Group IA ions other than lithium ions and Group IIA ions, at a temperature between 200° C. and 350° C. for a time ranging from 4 to 10 days.

18. The process of claim 17 wherein the $SiO_2/Al_2O_3$ molar ratio in the mixture ranges from 5 to 30, wherein the Li+/Si atomic ratio ranges from 0.40 to 1.25, and wherein the $H_2O/SiO_2$ molar ratio ranges from 9 to 50.

19. A composition comprising an aluminosilicate having a mesopore volume, as measured by nitrogen absorption, greater than 0.060 cc/g and having an X-ray diffraction pattern substantially as shown in Table 1:

TABLE 1

| 2Θ | d (A) | 100xI/Imax |
|---|---|---|
| 11.2 | 7.9 | 10 |
| 13.2 | 6.7 | 18 |
| 20.9 | 4.2 | 88 |
| 22.5 | 3.9 | 8 |
| 23.9 | 3.7 | 18 |
| 26.6 | 3.4 | 100 |
| 27.3 | 3.3 | 43 |
| 28.7 | 3.1 | 13 |
| 30.7 | 2.9 | 8 |
| 32.8 | 2.8 | 7 |
| 35.6 | 2.5 | 43 |
| 37.7 | 2.4 | 8 |
| 44.9 | 2.0 | 8 |
| 46.7 | 1.94 | 10 |
| 47.7 | 1.90 | 8 |
| 49.2 | 1.85 | 10 |
| 50.0 | 1.81 | 10. |

20. The composition of claim 19 wherein the composition is in the acid or ammonium form.

21. A method of using the composition of claim 19 as an adsorbent, comprising contacting the composition of claim 19 with at least one chemical which is capable of being adsorbed by the composition.

22. A composition comprising a ferrierite zeolite having a ratio of mesopore volume to combined micropore and mesopore volumes, as measured by nitrogen absorption, in the range from 0.25 to less than 1.00.

23. A method of using the composition of claim 22 as an adsorbent, comprising contacting the composition of claim 22 with at least one chemical which is capable of being adsorbed by the composition.

* * * * *